Oct. 15, 1957     A. P. KETTMANN     2,809,797
PORTABLE BUCKET SUPPORT FOR FRUIT PICKERS
Filed Jan. 18, 1954
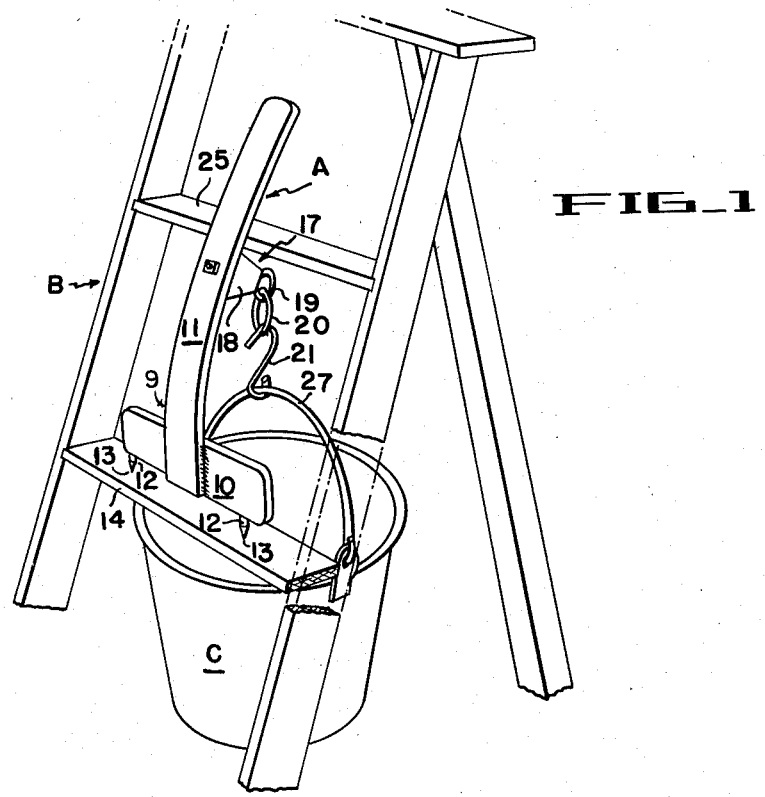
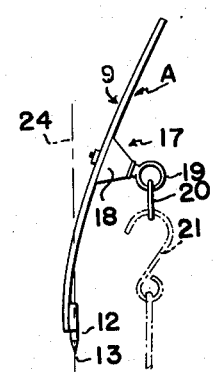
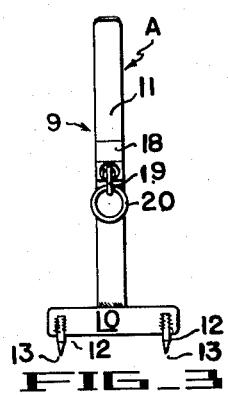
INVENTOR.
ANDREW P. KETTMANN
BY
*Hansen and Lane*
ATTORNEYS United States Patent Office 2,809,797
Patented Oct. 15, 1957

2,809,797

PORTABLE BUCKET SUPPORT FOR FRUIT PICKERS

Andrew P. Kettmann, San Jose, Calif.

Application January 18, 1954, Serial No. 404,491

5 Claims. (Cl. 248—210)

The present invention relates to bucket holders, and pertains more particularly to a device which can be readily mounted on any step except the topmost one of a fruit picker's ladder, and which will support a bucket in convenient position for receiving fruit deposited therein by the pickers.

In commercial fruit picking it is conventional practice to provide the pickers with a bucket and an orchard ladder, the lower ends of the sides of which are widely separated and which is provided with a single, hingedly connected support leg so that the ladder will have stable, three-point support on the more or less uneven ground surrounding the trees in an orchard.

The fruit pickers' buckets usually are provided with hooks on their bails for hooking onto various parts of the ladder or onto the limbs of the trees during picking. However, it frequently is difficult to hook the bucket in a position convenient for use, and therefore the more experienced pickers frequently hold the bucket bail in one hand and pick the fruit with the other. This is a severe restriction on the picker's speed, which would be greatly increased if a convenient support were available for the bucket so that both hands could be used for picking.

An object of the present invention is to provide an improved and simplified bucket support for use by commercial fruit pickers. Another object is to provide a support for a fruit picker's bucket which may be firmly mounted on any step except the topmost one of a stepladder, and which will gravitate tiltably toward the next higher step for support.

These and other objects and advantages of the invention will be apparent from the following description and the accompanying drawings, wherein:

Fig. 1 is a perspective view of the upper portion of a conventional fruit picker's ladder with a bucket holder embodying the present invention mounted thereon, a bucket being shown suspended therefrom, and a portion of the ladder being broken away.

Fig. 2 is a side elevational view of the bucket support shown in Fig. 1, a bucket bail and hook thereon being shown in broken lines.

Fig. 3 is a rear elevational view of the bucket holder shown in Fig. 1.

The illustrated form of the invention consists of a bucket holder A, the body 9 of which is made in the form of an inverted T. The body 9 comprises a head portion 10 and a flat, curved, upwardly extending stem portion 11. The stem portion 11 is curved concavely rearwardly with respect to the position of the device A on a conventional orchard type ladder B as shown in Fig. 1. A pair of anchoring support prongs 12, 12 are welded to the head 10 to project downwardly therefrom. The lower ends 13, 13 of these prongs are pointed to penetrate a step 14 of a ladder B upon which the device may be supported, thereby to anchor the device against slippage.

A bucket supporting projection 17, which, in the form of the invention illustrated, consists of a hardwood block 18, is mounted on the rear face of the curved stem portion 11 and is secured thereto by an eye bolt 19.

A ring 20 is linked into the eye bolt 19 to receive a bucket supporting hook 21 which customarily is provided on the bail 27 of the conventional fruit picker's bucket C by the bucket manufacturer.

In using the device, a picker ascends the ladder B to a height at which he desires to pick, and mounts the device A in position on a step 14 of the ladder B as shown in Fig. 1 to position the bucket C at a convenient height for depositing the picked fruit therein. The weight of the device A, even without the additional weight of the bucket C, is sufficient to press the pointed lower ends 13, 13 of the prongs 12, 12 into the wood of the ladder step 14 sufficiently to resist lateral dislodgement thereof. Most of the weight of the device is disposed rearwardly of a vertical line 24 (Fig. 2) through the pointed lower ends 13, 13 of the prongs 12, 12 so that the center of gravity of the device, even without the weight of a bucket C suspended therefrom, is well to the rear of the supporting prongs 12, 12. This tends to tilt the device rearwardly to urge the stem 11 toward a supporting upper step 25 and insures stability of the device on the ladder.

The bucket C then is moved into position rearwardly of the supporting step 14 upon which the device A is mounted, and the hook 21 is hooked into the ring 20. Since the point of bucket suspension at the lower side of the ring 20 is well to the rear of the line 24, the hooking of the bucket onto the device adds to its stability on the ladder. The position of the abutment 18 on the stem 11 and the size of the ring 20 are such as to position the upper rim of a usual bucket C below and clear of the supporting step of the ladder when the bucket is suspended from the ring by a bail 27 and hook 21 of usual size.

The picker picks fruit until the bucket is filled or the portion of the tree in which he is located has been stripped of fruit, whereupon he detaches the bucket C, picks up the device A, and moves either up or down as desired. The device A then may be mounted in a new position on the ladder convenient to the picker by placing the device A so that the prongs 12, 12, are supported upon another step 14 at a desired height, and again hooking the bucket bail 27 into position as illustrated in Fig. 1.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. A bucket holding device for use on a fruit picker's stepladder having flat topped steps, said bucket holder comprising a body consisting of two metal strips secured together in the form of a T for mounting in inverted position on a step of such ladder, the upright stem of said body portion being curved longitudinally thereof about an axis parallel to the head of the body portion, anchoring means mounted at each end of the strip forming the head of the body and projecting therefrom in a direction opposite to the strip forming the stem of the body for support on top of the flat step of a stepladder, a bucket support arm projecting from the concave side of the strip forming the stem of the body at a height from the lower ends of the anchoring means for projection between a step of such ladder upon which the head of the body is mounted and the next higher step, whereby the weight of such projection urges the upright stem portion tiltably against the forward edge of such higher step, and bucket bail engaging means mounted on the outer end of said abutment.

2. A bucket holding device for a flat-stepped fruit picker's ladder comprising an elongated body, a pair of support legs mounted on one end of said body for mounting on a selected step of such ladder to support the body upright and with an upper portion thereof leaning tiltably against the forward edge of the next higher ladder step, a bucket support member projecting from a side of said body at a height less than the separation between adjacent steps of such ladder for insertion between the ladder step upon which the legs are supported, whereby the weight of the abutment urges the body portion tiltably against the forward edge of the next higher step, and means mounted on the free end of said bucket support member for releasably attaching the bail of a fruit picker's bucket thereto.

3. A bucket holder for a fruit picker's ladder comprising a T-shaped body for mounting in inverted position with the head of the body supported on top of any except the topmost flat step of a stepladder, the stem of the body being of a length greater than the distance between adjacent steps of such ladder, a pair of body support points mounted on the head portion of the body and extending therefrom oppositely to the stem portion of said body for penetrating, supporting engagement with the top surface of a supporting ladder step, a bucket support abutment mounted on the rear side of said stem and extending rearwardly from the stem at a height from the supporting points less than the separation between adjacent steps of such ladder, whereby when the holder is mounted on a ladder with the points resting on a step thereof and with the rear side of the stem portion leaning tiltably against the forward edge of the next higher step, and the abutment projecting rearwardly between adjacent steps of the ladder, the weight of the abutment urges the stem portion to tilt by gravity toward such ladder step against which the stem portion is leaning, and means on the rear end of the abutment for connecting thereto the bail of a bucket for suspension of the bucket therefrom.

4. A bucket holding device for a fruit picker's ladder comprising a T-shaped body for mounting in inverted position on a flat step of a stepladder with the rear side of the stem portion of the body leaning tiltably rearwardly against the forward edge of the next higher step thereof, a bucket support abutment mounted on the rear side of the stem of said body and extending rearwardly from a plane defined by the outer ends of the head and the base of the abutment at a height less than the separation between adjacent steps of such ladder whereby, with the head of the body portion resting on the top of one step of a ladder and the stem of the body portion substantially upright, and the abutment projecting rearwardly between a ladder step upon which the body is supported and the next higher step, the abutment projects rearwardly between these two such steps and the weight of the abutment tiltably urges the rear side of the stem portion against the forward edge of such next higher step and thus resists forward tilting of the body away from the latter step, and bucket attaching means mounted on an outer portion of the abutment for suspending a fruit picker's bucket therefrom.

5. A bucket holding device for use on a fruit picker's ladder comprising an inverted T-shaped body, the head thereof being of lesser length than an upper step of a ladder upon which the device is to be mounted, the stem of said body portion being of band metal curved longitudinally thereof about an axis parallel to the body head, and of a length greater than the distance separating adjacent steps of such ladder, a pair of support legs mounted one adjacent each end of the head portion to extend oppositely from the stem for support on a selected step of such a ladder, a bucket support abutment of substantial weight mounted on the concave side of said stem portion to extend rearwardly therefrom at a height from the lower ends of the support legs less than the separation between adjacent steps of such ladder, whereby, when the holder is supported by its legs resting on one step of a ladder and with the concave side of the stem portion leaning tiltably against the forward edge of the next higher step, and the abutment projecting rearwardly between adjacent steps of the ladder, the weight of the abutment urges the stem of the body to tilt by gravity toward the concave, step supported side of the stem, and means mounted on an outer portion of said abutment for attaching thereto the bail of a fruit picker's bucket for suspension of the bucket therefrom.

References Cited in the file of this patent

UNITED STATES PATENTS

| 235,126 | Calhoun | Dec. 7, 1880 |
| 2,628,071 | Williams | Feb. 10, 1953 |

FOREIGN PATENTS

| 35,926 | France | Mar. 31, 1930 |